(12) United States Patent
Girardot et al.

(10) Patent No.: US 7,089,567 B2
(45) Date of Patent: Aug. 8, 2006

(54) EFFICIENT RPC MECHANISM USING XML

(75) Inventors: Marc Georges Girardot, Paris (FR);
Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 891 days.

(21) Appl. No.: 09/828,542

(22) Filed: Apr. 9, 2001

(65) Prior Publication Data
US 2003/0023628 A1    Jan. 30, 2003

(51) Int. Cl.
*G06F 9/46* (2006.01)
(52) U.S. Cl. ...................................... 719/330
(58) Field of Classification Search .................. 719/330
See application file for complete search history.

(56) References Cited

U.S. PATENT DOCUMENTS

| 5,944,781 | A | * | 8/1999 | Murray ........................ 709/202 |
| 6,772,216 | B1 | * | 8/2004 | Ankireddipally et al. ... 709/230 |
| 6,782,542 | B1 | * | 8/2004 | Mein et al. .................. 719/330 |

OTHER PUBLICATIONS

"Millau: an encoding format for efficient representation and exchange of XML over the Web," 9th International World Wide Web Conference, Amsterdam, May 2000.

(Continued)

*Primary Examiner*—William Thomson
*Assistant Examiner*—Andy Ho
(74) *Attorney, Agent, or Firm*—Lacasse & Associates, LLC; Randy W. Lacasse; Ramraj Soundararajan

(57) ABSTRACT

The present invention provides for a system and method of performing efficient XML-RPC. Generally, the system comprises a client which generates XML-RPC requests in a compression format which encodes tags, attributes and attribute values as tokens rather than strings and transmits the request to a server. The server gets the requests from the client, invokes the corresponding method and sends a response encoded in the same format that the clients request was encoded in. In a further aspect of the present invention, the client receives a URL of a valid XML-RPC server. The client establishes a persistent connection with the server via a request utilizing the URL. The method to be called utilizing XM-RPC is passed to the client along with the associated parameters. The client generates and XML-RPC request which is transmitted in an encoding format which represents at least a portion of the tags (and attributes and attribute values if present) as tokens rather than strings. The server receives the requests, and after being parsed receives the method to be called and the associated parameters. The server attempts to locate the method and handler in a hash table, and if available, calls the method. When the return parameters of the method are returned to the server, it encodes the parameters in a XML-RPC response according to the tokenized format, and sends the response back to the client. The response is then parsed and the client obtains the parameters, which it then utilizes as appropriate.

40 Claims, 5 Drawing Sheets

OTHER PUBLICATIONS

Dave Winer, "An XML-PRC interface for XML-PRC.Com," <xmlrpc.com/spec>, Aug. 1999.

Huffman, D.A., "A Method for the Construction of Minimum-redundancy Codes," Proceedings of the IRE, vol. 40, No. 9, Sep. 1952, pp. 1098-1101.

Ziv et al., "A Universal Algorithm for Sequential Data Compression," IEEE Transaction on Information Theory, vol. 23, No. 3, May 1997, pp. 337-343.

P. Deutsch, "DEFLATE Compressed Data Format Specification version 1.3," RFC 1951, Aladdin Enterprises, May 1996.

P. Deutsch, "GZIP File Format Specification Version 4.3," RFC 1952, Aladdin Enterprises, May 1996.

Deutsch et al., "ZLIB Compressed Data Format Specification Version 3.3," RFC 1950, May 1996.

Horspool et al., "Constructing Word-Based Text Compression algorithms," IEEE Transaction on Information Theory, 1992.

Larsson et al., "Offline Dictionary-Based Compression," IEEE Transaction on Information Theory, 1999.

"WAP Binary XML Content Format," <http://www.w3.org/TR/wbxml>.

"Document Object Model (DOM) Level 1 Specification Version 1.0, W3C Recommendation 1," <http://www.w3.org/TR/REC-DOM-Level-1>.

"SAX 1.0: The Simple API for XML," <http://www.megginson.com/SAX/>.

* cited by examiner

Single Stream:

Divided Streams:

EFFICIENT RPC MECHANISM USING XML

BACKGROUND OF THE INVENTION

1. Field of Invention

The present invention relates generally to the field of remote procedure calls. More specifically, the present invention is related to performing remote procedure calls utilizing a markup language which is encoded utilizing tokens as the marshalling format.

2. Discussion of Relevant Art

In computer processing systems, and distributed or parallel processing systems in particular, one of the issues which must be faced is interprocess communication and synchronization. Interprocess communication and synchronization concerns itself with how different processes, typically running in parallel, cooperate. For example, if a data item D is needed by a first process $P_1$ and the data item D is the result of a second process $P_2$, there must be a method of transferring the data D between the two processes. In addition, if process $P_2$ has not been able to communicate the data D to process $P_1$, then the first process $P_1$ must be able to wait for the data D.

One of the ways in which interprocess communication is performed is via message passing. In message passing communication, as opposed to other methods such as data sharing, a sender process sends a message to or invokes a receiving process. As part of the message or invocation, parameters are provided to the receiving process. These parameters are items that the receiver process needs to perform its function.

The most elementary primitive for message passing communications is one-way, point-to-point passing of the message. However, most interactions between processes are essentially two way interactions. While this can be simulated using two point-to-point messages, having a single construct for two-way messaging is more efficient. One such construct is the remote procedure call (RPC). A remote procedure call is just like a normal procedure call except the caller and sender are different processes, such as processes running in two different applications, or on different machines. For an RPC, a first process A calls a remote procedure R of process B and sends the input parameters P to B. When B receives the invocation request, it executes the procedure R and returns the output parameters back to A. After A calls R, A is blocked until it receives back the output parameters.

The remote calls, such as those made by A, are marshalled into a format that is understood by both processes. Machines which are running the same software have no problem understanding the calls initiated by another machine, because the marshalled formats will be the same. For instance, two machines running Windows™ can be networked together and perform RPCs without any problems. However, difficulties exist when RPCs are to be made across platforms, as the processes may not be able to agree on the marshalled format.

This difficulty leads to the need for a standardized cross-platform approach for performing RPCs. With a cross-platform approach, a system running Windows™ and a system running Unix™ can easily perform RPCs. This need has lead to the development of a cross-platform RPC approach known as XML-RPC. For XML-RPC, XML is utilized as the marshalling format. XML-RPC leverages technologies, such as XML, which were designed to be platform independent. The XML-RPC protocol performs remote procedure calls over HTTP. The XML-RPC message is an HTTP-POST request. As is well known, the HTTP-POST method is used to send data which is to be processed in some way by the server. The body of an XML-RPC request is in XML. Based upon the request, a procedure executes on the server and the value returned by the procedure is formatted in XML and returned to the client. The procedure parameters can be scalars, numbers, strings, dates, etc., and can also be complex records and list structures. The drawback to XML-RPC is that it generates large HTTP messages over the network, utilizing a larger amount of the network bandwidth. There is a need to reduce the overabundant bandwidth usage when performing remote procedure calls utilizing XML-RPC.

One method of dealing with bandwidth problems in general has been the use of compression. A lot of work has already been done on lossless data compression (Mark Nelson, The Data Compression Book, M&T Books, 1992). Researchers have developed fast and powerful algorithms for data compression. Their principles are mostly based on Claude Shannon's Information Theory. A consequence of this theory is that a symbol that has a high probability has a low information content and will need fewer bits to encode. In order to compress data well, you need to select models that predict symbols with high probabilities. Huffman coding (Huffman, D. A., "A Method for the Construction of Minimum-redundancy Codes," Proceedings of the IRE, Vol. 40, No. 9, September 1952, pp. 1098–1101) achieves the minimum amount of redundancy possible in a fixed set of variable-length codes. It provides the best approximation for coding symbols when using fixed-width codes. Huffman coding uses a statistical model because it reads and encodes a single symbol at a time using the probability of that character's appearance. A dictionary-based compression scheme uses a different concept. It reads input data and looks for groups of symbols that appear in a dictionary. If a string match is found, a pointer or index into the dictionary can be output instead of the code for the symbol. The longer the match, the better the compression ratio. In LZ77 compression (Ziv et al., "A Universal Algorithm for Sequential Data Compression," IEEE Transaction on Information Theory, Vol. 23, No. 3, May 1997, pp. 337–343), for example, the dictionary consists of all the strings in a window into the previously read input stream. The deflate algorithm (P. Deutsch, "DEFLATE Compressed Data Format Specification version 1.3," RFC 1951, Aladdin Enterprises, May 1996) uses a combination of the LZ77 compression and the Huffman coding. It is used in popular compression programs like GZIP (P. Deutsch, "GZIP File Format Specification Version 4.3," RFC 1952, Aladdin Enterprises, May 1996) or ZLIB (Deutsch et al., "ZLIB Compressed Data Format Specification Version 3.3," RFC 1950, May 1996).

One drawback of these text compression algorithms is that they perform compression at the character level. If the algorithm is adaptive (as, for example, with LZ77), the algorithm slowly learns correlations between adjacent pairs of characters, then triples, quadruples and so on. The algorithm rarely has a chance to take advantage of longer range correlations before either the end of input is reached or the tables maintained by the algorithms are filled to capacity, especially with small files. To address this problem, R. Nigel Horspool and Gordon V. Cormack explore the use of words as basic units of the algorithm (Horspool et al., "Constructing Word-Based Text Compression algorithms," IEEE Transaction on Information Theory, 1992). In most implementations of dictionary-based compression, the encoder operates online, incrementally inferring its dictionary of available phrases from previous parts of the message. An alternative approach proposed by N. Jasper Larsson and Alistair Moffat (Larsson et al., "Offline Dictionary-Based Compression," IEEE Transaction on Information Theory, 1999) is to infer a complete dictionary offline to optimize the choice of phrases so as to maximize compression performance. An additional disadvantage of these algorithms is the fact that they are unable to retain the structure of an XML document.

The Wireless Application Protocol Forum has proposed an encoding format for XML based on a table (the code space) that matches tokens to XML tags and attribute names ("WAP Binary XML Content Format"). It takes advantage both of the offline approach (the code space can be built offline) and of the word-based compression (tags and attribute names are usually the most frequent words in an XML document). Moreover, unlike the previous compression algorithms, it retains the structure of XML documents. But it does not compress at all the character data content nor the attribute values which are not defined in the Document Type Definition (DTD). Moreover, it does not suggest any strategy to build the code space in an efficient way. The preferred encoding format utilized by the present invention addresses both of these drawbacks: it is designed to compress character data and defines a strategy to build code space. The present invention allows for remote procedure calls to be performed utilizing XML-RPC with a reduction in bandwidth utilization.

SUMMARY OF THE INVENTION

The present invention provides for a system and method of performing efficient remote procedure calls using a markup language as the marshalling format. Generally, the system comprises a client which generates requests as markup language documents in a compression format which encodes tags, attributes and attribute values as tokens rather than strings and transmits the request to a server. The server gets the requests from the client, invokes the corresponding method and sends a response encoded in the same format that the clients request was encoded in.

In a further aspect of the present invention, the client receives a URL of a valid server. The client establishes a persistent connection with the server via a request utilizing the URL. The method to be called is passed to the client along with the associated parameters. The client generates a request markup language document, containing the name of the method and associated parameters, which is transmitted in an encoding format which represents at least a portion of the tags (and attributes and attribute values if present) as tokens rather than strings. The server receives the request, and after being parsed receives the method to be called and the associated parameters. The server attempts to locate the method and handler in a hash table, and if available, calls the method. When the return parameters of the method are returned to the server, it encodes the parameters in a XML-RPC response according to the tokenized format, and sends the response back to the client. The response is then parsed and the client obtains the parameters, which it then utilizes as appropriate.

In a preferred embodiment, the client establishes the persistent connection with the server via a servlet which creates the server when it receives a request from the client. Upon creation of the server, a persistent connection is established and handlers and associated methods are registered with the server. References to the methods and handlers are stored in a hash table.

In a further embodiment of the present invention, the parser which parses the tokenized document implements an event based API. In one embodiment, the event based parser passes events as strings. In a different embodiment, the event based parser passes events as tokens.

In an alternative embodiment, the parser which parses the tokenized document implements a tree based API. In one embodiment, the nodes are stored as strings in the tree representation. In a different embodiment, the nodes are stored as tokens in the tree based representation.

Preferably, the markup language utilized is XML and the XML-RPC protocol is followed.

DESCRIPTION OF THE PREFERRED EMBODIMENTS

Figure 1A:
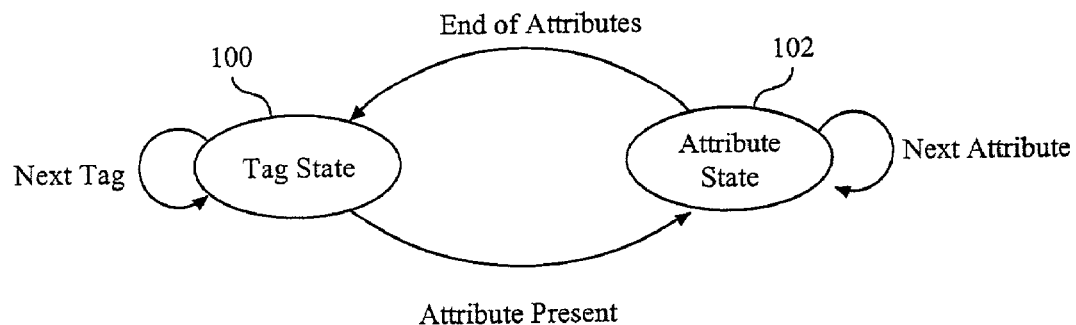
FIG. 1a illustrates the parser state machine of the WBXML encoding method

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

A digression into the development and implementation of the preferred embodiment of the XML compression technique helps to highlight the advantages of the system and method of the present invention.

The preferred encoding format is an extension of the WAP Binary XML format. The WBXML (Wireless Application Protocol Binary XML) Content Format Specification defines a compact binary representation of XML. This format is designed to reduce the transmission size of XML documents with no loss of functionality or semantic information. For example, WBXML preserves the element structure of XML, allowing a browser to skip unknown elements or attributes. More specifically, the WBXML content encodes the tag names and the attributes names and values with tokens (a token is a single byte).

In the WBXML format, tokens are split into a set of overlapping "code spaces". The meaning of a particular token is dependent on the context in which it is used. There are two classifications of tokens: global tokens and application tokens. Global tokens are assigned a fixed set of codes in all contexts and are unambiguous in all situations. Global codes are used to encode inline data (e.g., strings, entities, opaque data, etc.) and to encode a variety of miscellaneous control functions. Application tokens have a context-dependent meaning and are split into two overlapping "code spaces", the "tag code space" and the "attribute code space":

The tag code space represents specific tag names. Each tag token is a single-byte code and represents a specific tag name. Each code space is further split into a series of 256 code pages. Code pages allow for future expansion of the well-known codes. A single token (SWITCH_PAGE) switches between the code pages.

The attribute code space is split into two numeric ranges representing attribute prefixes and attribute values respectively. The Attribute Start token (with a value less than 128) indicates the start of an attribute and may optionally specify the beginning of the attribute value. The Attribute Value token (with a value of 128 or greater) represents a well-known string present in an attribute value. Unknown attribute values are encoded with string, entity or extension codes. All tokenized attributes must begin with a single attribute start token and may be followed by zero or more attribute value, string, entity or extension tokens. An attribute start token, a LITERAL token or the END token indicate the end of an attribute value.

In the preferred format, an Attribute Start token is followed by a single Attribute Value token, string, entity or extension token. So there is no need to split the attribute token numeric range into two ranges (less than 128 and 128 or greater) because each time the parser encounters an Attribute Start token followed by a non-reserved token, it knows that this non-reserved token is an Attribute Value token and that it can be followed only by an END token or another Attribute Start token. Thus instead of two overlapping code spaces, there are three overlapping code spaces:

the tag code space as defined in the WAP Specification,
the attribute start code space where each page contains 256 tokens,
the attribute value code space where each page contains 256 tokens.

It should be noted that, in WBXML format, character data is not compressed. It is transmitted as strings inline, or as a separate stream. This allows the content to be separate from the structure so that an application can separately download the structure and the content or just a part of each. This further allows the compression of the character data using traditional compression algorithms like deflate. In the structure stream, character data is indicated by a special global token (STR or STR_ZIP) which indicates to the parser (discussed below) that it must switch from the structure stream to the content stream if the user is interested in content and whether the content is compressed (STR) or uncompressed (STR_ZIP). Optionally, the length of the content is encoded as an integer in the structure stream right after the global token (STR_L or STR_ZIP_L). If the length is not indicated, the strings contained in the structure must terminate with a End Of String character or a null character.

The preferred encoding format efficiently represents character data but additional advantages are realized, when it is taken into account that in, for example, typical business to business communications, most of the attribute values are of primitive type like boolean, byte, integer or float. For example, in a set of typical business to business XML messages provided by the Open Application Group ("Open Applications Group"), 70% of the attribute values are of the primitive type. It is inefficient for these attribute values to be transcoded in strings in a binary representation of an XML document. Therefore, the extension codes are used to prefix primitive types like bytes, integers or floats. The following table reminds the meanings given to the global tokens by the WBXML Encoding Specification and also precises the meanings of the extension tokens which have been redefined for the needs of the preferred encoding method (these tokens appear in bold in table 1).

TABLE 1

| Token Name | Token | Description |
| --- | --- | --- |
| SWITCH_PAGE | 0 | Change the code page for the current token state. Followed by a single u_int8 indicating the new code page number. |
| END | 1 | Indicates the end of an attribute list or the end of an element. |
| ENTITY | 2 | A character entity. Followed by an integer encoding the character entity number. |
| STR_I | 3 | Inline string. Followed by a string. |
| LITERAL | 4 | An unknown tag or attribute name. Followed by an integer that encodes an offset into the string table. |
| FALSE | 40 | Encodes the boolean value false. |
| TRUE | 41 | Encodes the boolean value true. |
| FLOAT | 42 | Inline float. Token is followed by an integer representing the floating-point argument according to the IEEE 754 floating-point "single precision" bit layout. |
| PI | 43 | Processing instruction. |
| LITERAL_C | 44 | Unknown tag, with content. |
| STR_L | 80 | Indicates that uncompressed character data has been written to the content stream. Followed by an integer indicating the number of characters. |
| STR_ZIP_L | 81 | Indicates that compressed character data has been written to the content stream. Followed by an integer indicating the number of characters. |
| EXT_T_2 | 82 | Inline integer. Token is followed by an integer. |
| STR_T | 83 | String table reference. Followed by an integer encoding a byte offset from the beginning of the string table. |
| LITERAL_A | 84 | Unknown tag, with attributes. |
| STR | C0 | Indicates that uncompressed character data has been written to the content stream. |
| STR_ZIP | C1 | Indicates that compressed character data has been written to the content stream. |
| BYTE | C2 | Inline byte. Followed by a single byte. |
| BINARY | C3 | Binary data. Followed by an integer indicating the number of bytes of binary data. |
| LITERAL_AC | C4 | Unknown tag, with content and attributes. | reference in a string table which is transmitted at the beginning of the document. In the preferred encoding format, character data is capable of being transmitted on a While the above description is sufficient for one of skill in the art to understand the benefits of the preferred encoding format and to modify the WBXML encoding format to practice the preferred encoding format, further explanation will aid in an easier understanding of the preferred encoding format.

As previously described, in the WBXML encoding specification, tags, attribute names, and attribute values can be tokenized to provide a more efficient representation, based upon whether or not the specific tag, attribute, or value is expected within a given document type and hence built offline into the corresponding code space. For instance, the tags <book>, <title>, <chapter>, and <picture> are all tags which are defined for a given document type. Therefore, each of the tags will be represented by a given token in the tag space. As an example, the tag <book> is given a token 5, <title> is given a token 6, and so on. For a given document, a tag may have an associated attribute, which is known a priori, and the associated attribute may have a number of different possible values, some of which are known a priori. The attributes are represented by a given token in the attribute space, were attributes are given a token value less than 128. Attribute values are represented by a given token having a value greater than 128 in the attribute space. For instance, the tag <book> has an associated attribute "genre" which is given a token 5 and the attribute "genre" has as one possible associated value "literature", which is given a token 129 Therefore, if a document contained the line <book genre="literature">, this would be represented by the tokens (in decimal) 5 5 129. The interpretation of a token by the parser depends on which state the parser is in. When the parser is parsing the XML document containing the tokens 5 5 129, it initially operates in the tag code space, sees 5 and interprets this as the tag <book>, then switches (explained below) to operation in the attribute space and therefore, when it sees 5, it interprets this as the attribute "genre" (it knows this is an attribute start because attribute starts have values less than 128 in the attribute space) and when it sees 129, it interprets this as "literature" (it knows that this is a value of the attribute because attribute values have values greater than 129).

FIG. 1a illustrates the parser state machine of the WBXML encoding method and, thus, how it moves between code spaces. The tag token structure is an 8 bit unsigned integer. Bit 7 (the most significant bit) is set to a 1 when a tag has an associated attribute, if not, it is set to 0. Bit 6 is set to a one when the tag has content. Content is data which is typical displayed or operated on by an agent, i.e., applications which process XML documents. For instance, a snippet of a document may be:

<H1>
   This is a demonstration.
</H1>

The tag <H1>tells the agent how to handle (i.e., display it to the user as a certain size) the content, the content being the sentence "This is a demonstration."

When the parser is reading the XML document, it initially starts in the tag space state 100. When the parser reads a token, it interprets the token based upon its token definitions established in the tag space. When it reads a tag token, it interprets the tag, and if it notes that the tag has associated attributes it switches to the attribute space state 102. If there are no attributes associated with the tag, it stays in the tag space state waiting for the next token to be interpreted as a tag token. When in the attribute space, it interprets the tokens according to its attribute code space. The parser continues to interpret tokens as attribute tokens until it receives an END token, at which point it moves back to the tag space state and waits to interpret the next token as a tag token. In the previous example, if content also followed the tag and attributes, the tag token 5 would actually be represented by 0xC5 (where 0x represents hexadecimal form). Therefore the tokenized stream (in hexadecimal) would be:

C5 05 81 01, where 01 is the END token. The parser starts in the tag state 100, reads and interprets C5 as the <book> tag having an associated attribute. The parser then switches to the attribute state, reads 05, interprets it as the "genre" attribute. The parser then reads 81, and because its value is greater than 128 (0x80), rather than interpret this as another attribute, it interprets it as the value "literature" of attribute "genre."

As previously described, the tokens are divided into a global class and application class. This allows for some tokens to function in the same fashion regardless of the code space the parser is operating in. For instance, it is beneficial for an indication that the following binary information is an inline string, so the parser can properly interpret the data in both the tag and attribute spaces. This is represent by the global token STR_I. In the same fashion the END token is a global token.

In the WBXML format, attribute starts and attribute values are distinguished by attribute starts having values less than 128 and attribute values having values greater than 128. This is done so that when an attribute value consists of more than one item, commonly used elements of an attribute item can also be tokenized. This is illustrated in the following example as provided in the WBXML specification. An attribute start token TOKEN_URL represents the attribute name "URL". The attribute URL typically has a value which looks something like http://foo.com/x. The portions http:// and .com are parts which are likely to be a part of all attribute values of the attribute "URL", and are therefore represented TOKEN_HTTP and TOKEN_COM respectively. In WBXML, the above would be encoded as:

TOKEN_URL TOKEN_HTTP STR_I "foo" TOKEN_COM STR_I "/x"

This illustrates, that in the WBXML encoding format, an attribute start can be followed by more than one attribute value, hence, there is a need to determine if the next token is an attribute start or an attribute value.

In the preferred encoding format, an attribute start can only be followed by a single attribute value, string, entity, or extension token. In the preferred encoding format, the above example would be encoded (as one possibility) as the following:

TOKEN_URL STR_I "http://foo.com/x"

where the attribute value is transmitted as an inline string, or

TOKEN_URL STR_Z where STR_Z indicates that the attribute value should be retrieved from the content stream (explained below). By placing this restriction, each time the parser encounters an attribute start token followed by a non-reserved token, it knows that this non-reserved token is an attribute value token and that it can be followed only by and END token or another attribute start token, not another attribute value token, a string token, or an entity token. This effectively provides for three overlapping code spaces as described above.

Figure 1B:
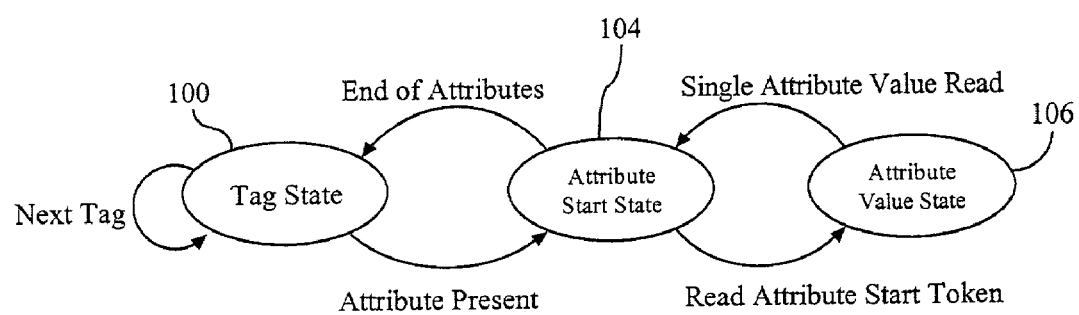
FIG. 1b illustrates the parser state machine for the preferred encoding method.

FIG. 1b illustrates the parser state machine for the preferred encoding method. In this case, the parser starts in the tag space state 100, which is the same as that in the WBXML specification. If the tag has an associated attribute, the parser moves to the attribute start space state 104. It then reads and interprets the tokens utilizing the attribute start code space. After it reads an attribute start, it moves to the attribute value space state, where it reads and interprets tokens according to the attribute value code space. After it reads a single attribute value token, or a string, entity or extension token, the parser returns to the attribute start space state 104. If it then reads another attribute start token, it then moves back to the attribute value space state 106. Otherwise it will encounter an END token and return to the tag space state 100.

To understand why the parser may encounter not only an attribute value token, but alternatively, string, entity, or extension tokens, it should be noted that both the WBXML encoding specification and the preferred encoding method allow attribute values to be represented by tokens, strings or entities. This is done to allow extensibility to applications processing the document. For specific document types there are specific attribute values which can be encoded using tokens. However, proprietary applications which deviate from the specifications which dictate attribute values may not have tokens defining specific attributes, yet there must be a way to allow for representations of these values so that they can be utilized by the applications. As applications typically read XML documents as character data, the most expedient way to allow for this extensibility is to represent the values as character data.

By providing for three code spaces, the number of attribute start tokens and attribute value tokens able to be utilized is increased. This is due to the fact that both of these tokens are represented by 8 bit unsigned integers and by having the parser change code spaces, reusability of tokens is provided. In addition, both the WBXML encoding specification and the preferred encoding format provide for more than one code page per code space. A code page is all of the tokens which can be represented by the 8 bit unsigned integer. When a code page for a given code space is switched, a given token can be used to represent something different within the code space. The preferred encoding format allows for a greater representation of tokens than the WBXML format not only by the fact it not only allows for reusability of tokens within a code space, but it also allows for reusability based upon token use by the parser by introducing an additional code space for the parser to interpret tokens.

Figure 2A:
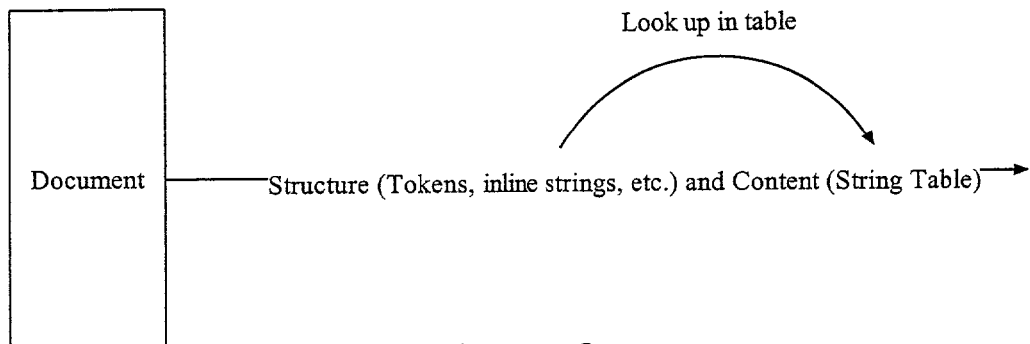
FIG. 2a illustrates content data transmitted as a string table in the same data stream as the structure data according to the WBXML encoding format.

Also, as previously described, the preferred encoding method allows for the separation of document structure data, such as tags and attributes, from content data. As illustrated in FIG. 2a, in the WBXML specification, the content data is transmitted (or stored) as a string table in the same data stream as the structure data. In order to access the content data, tokens in the document indicate, at the point where the content is to appear, that the content should be retrieved from the table, as illustrated.

For example, in the case of the following document snippet:

<Title>Sample Book</Title>

The corresponding (high level view) Binary XML stream would be transmitted (or stored) as:

```
.
.
.
String table length (10)
String table (S, a, m, p, l, e, B, o, o, k, 00)
.
.
.
TITLE_TOKEN        (Token indicating title tag)
STR_T              (Token indicating string table reference)
String table Index (Index into string table: 00)
END                (End token indicating end of title tag)
```

Where the 00 in the string table indicates an end of character and the 00 for the string table index represents starting at the first string in the string table. As can be seen, the content data constitutes part of the transmitted document. Because of this, in the WBXML specification, character level compression, e.g. deflate, is not performed on the content stream.

Figure 2B:
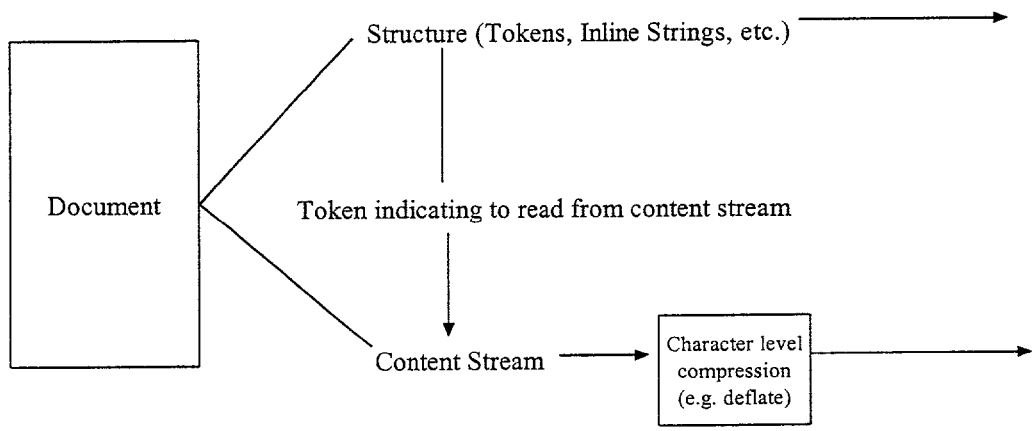
FIG. 2b illustrates content data separated out from the structure stream according to the preferred encoding format.

In the preferred encoding format, while string tables can also be utilized, there is the ability to separate content data into a stream separate from the structure data. This is illustrated in FIG. 2b. In the preferred encoding format, when content data is located at a point in the structure stream, a token is utilized to indicate from the parser it should retrieve the data from the content stream. In this manner, character level compression can be applied to the content data, allowing for more efficient transmission (or storage) of the document. It also provides an application the ability to only retrieve structure data or content data, or both. Utilizing the above snippet, in the preferred encoding format the corresponding (high level view) Binary XML stream would be transmitted (or stored) as:

```
.
.
.
TITLE_TOKEN  (Token indicating title tag)
STR_Z        (Token indicating parser to switch to content stream,
              string information is compressed)
END          (End token indicating end of title tag)
``` where the content data is transmitted separately. Pieces of content are stored sequentially in the content stream, therefore, a piece of content starts where the previous piece ends. In this manner there is not a need for an index to the content.

The following provides for an overall example of the preferred encoding method by showing an example of a simple tokenized XML document. The source document is:

<?xml version="1.0" encoding="UTF-8"?>
<!DOCTYPE Book [
<!ELEMENT Book (Title, Chapter+, Picture+)>
<!ATTLIST Book
Author CDATA #REQUIRED
Genre (literature|science|history|cartoons) #REQUIRED>
<!ELEMENT Title (#PCDATA)>
<!ELEMENT Chapter (#PCDATA)>
<!ATTLIST Chapter
id ID #REQUIRED>
<!ELEMENT Picture (#PCDATA)>
<!ATTLIST Picture
Caption CDATA #REQUIRED>
]>
<Book Author="Anonymous" Genre="literature">
<Title>Sample Book</Title>
<Chapter Number="1">
This is chapter 1. It is not very long or interesting.
</Chapter>
<Chapter Number="2">
This is chapter 2. Although it is longer than chapter 1, it is not any more interesting.
</Chapter>
<Picture Caption="Nice picture">
[base 64 encoded binary data]
</Picture>
</Book>

Tokens for the tag code space, the attribute names code space, and the attribute value code space are defined in table 2.

TABLE 2

| Tag code space | | Attribute name code space | | Attribute value code space | |
| --- | --- | --- | --- | --- | --- |
| Tag Name | Token | Attribute Name | Token | Attribute Value | Token |
| Book | 5 | Author | 5 | literature | 5 |
| Title | 6 | Genre | 6 | science | 6 |
| Chapter | 7 | Number | 7 | history | 7 |
| Picture | 8 | Caption | 8 | cartoons | 8 |

Tokenized form (numbers in hexadecimal) follows:
01 01 6A 00 C5 05 03 "Anonymous"06 05 01 46 C1 C7 07 C2 01 01 C1 01 C7 07 C2 02 01 C1 01 C8 08 03 "Nice picture"01 C3 . . . 01 01

The numbers 01, 01, 6A and 00, indicate, respectively, the version number, publicid, character set encoding and string table length, all as defined in the WBXML specification. Note that even in the preferred encoding format, a string table may be useful and therefore an indication of its length is still provided. The present invention parser then moves into the tag space state. C5 indicates the <book> tag and that it has both attributes and content associated with it. This causes our parser to switch to the attribute start space state. 05 in the attribute start space state indicates the attribute name (and an attribute start) of "Author." At this point the parser moves into the attribute value space state, reads the inline string "Anonymous" (which it knows is an inline string by the 03 token which indicates an inline string—see global definitions in Table 2) and moves back to the attribute start space state. When it sees 06, it interprets it as the "Genre" attribute. 05 indicates the value of "Genre" is "literature." When the parser sees 01, it knows the end of the attributes associated with <book> have ended and moves back to the tag state. When it sees 46, it is interpreted as the <Title> tag which has content without any attributes. When C1 is read, it indicates that the parser should switch to the content stream to retrieve the content associated with the tag <Title>. The rest of the document is processed in a similar manner.

The WBXML specification and the preferred encoding format allows for much more space and bandwidth efficient representation of an XML document. This may not be readily apparent if it is not understood that XML documents are typically encoded and parsed using strings. Each character of the strings itself may utilize 8 bits, and therefore a single tag, attribute or value may encompass 16, 32, 64 or more bits to be represented in the traditional manner. Further, the preferred encoding method provides for a much more robust, flexible and more highly compressed implementation than the WBXML format.

The preferred encoding format is designed to represent XML documents in a compact way using tokens to represent tags and attributes instead of strings. The previous discussions have been made with regards to a parser which could work directly upon the binary XML format which utilizes the tokens. However, it is possible to decompress the compressed streams and work on them utilizing a conventional parser. While this is the case, however, particular advantages in processing speed are realized if parsers are implemented which work directly upon the compressed stream itself. Preferably, parsers for documents encoded using this format are built implementing the two standard application programming interfaces (API): DOM ("Document Object Model (DOM) Level 1 Specification Version 1.0, W3 C Recommendation 1") and SAX ("SAX 1.0: The Simple API for XML").

As is well understood in the art, an API provides a set of interfaces which an application uses to access lower level utilities. Thus, for example, if an application wants to perform an operation that is handled by the operating system, such as a file operation, it does so through the API. The API provides a level of abstraction between the application and the lower level utilities so that the programmer need not worry about the mechanics the system utilizes to perform the underlying utility. Thus the programmer can write his program regardless of the operating platform and as long as the platform supports the API, the program can be used by that platform. In the case of DOM or SAX these APIs provide a set of standard interfaces which are used by the programmer to access and update the content, structure, and style of the document. The parser is a utility which sits as a thin layer below the API and is used to read and present the document to the application through the API. The parser parses the document and presents it in a format consistent with the API it implements. Other utilities are used and accessed through the API to update or change the document.

Figure 3:
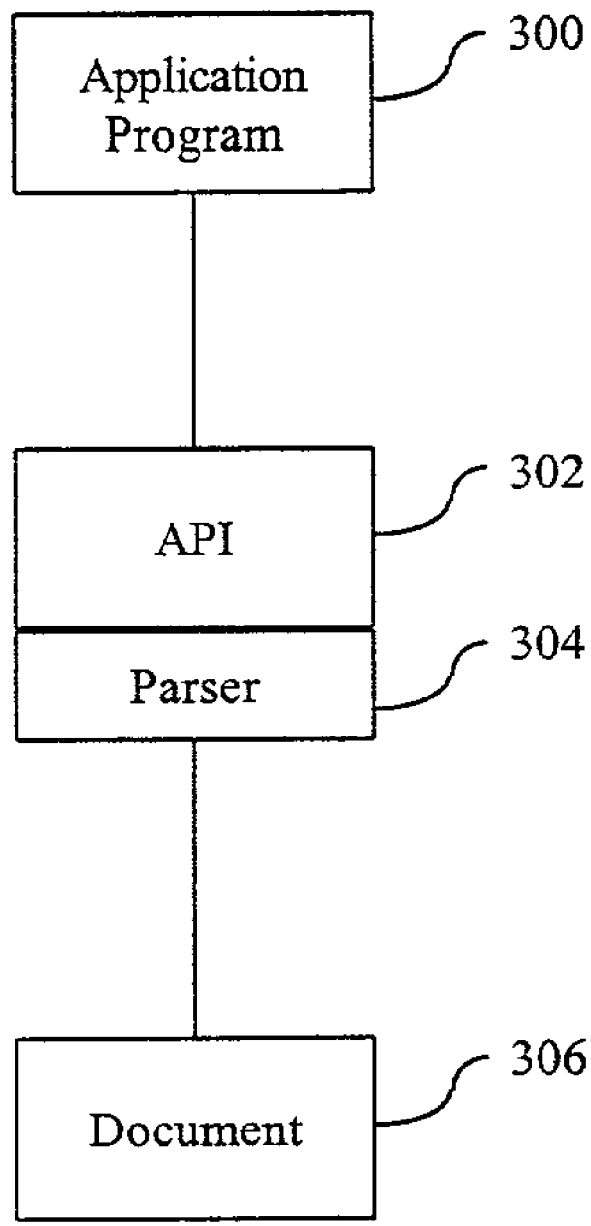
FIG. 3 illustrates the concept of the API acting as an interface for the application.

This concept is illustrated in FIG. 3. The application 300 sits on top of the API 302. The parser 304 sits as a thin layer below API 302, parses the document 306 and presents it in a format consistent with API 302.

DOM is the tree model API used to represent and process parsed XML document trees. The SAX API has an event-based streaming model typically used to process large XML documents without actually building a parse tree. The concepts of an API and the DOM and SAX APIs are well known in the art and further descriptions not related to the preferred encoding format or efficient XML-RPC system of the present invention will not be made.

The following discussions describe four parsers operable to work on the compressed stream encoded with the above described preferred compression. Generally, these will be designated as compression parsers. The first two implement the SAX API. The first SAX parser produces traditional SAX events, as defined by the SAX API. This means that each time it encounters a tag token, it generates a startElement event passing the name of the tag. The name matching the tag token is found in the code spaces. The second SAX parser, which will be called the BSAX (Binary SAX) parser, extends the SAX API by providing events which pass tokens instead of strings. This parser has been designed for applications that are able to handle tokens instead of strings.

The next two parsers implement the DOM API. The first DOM parser creates a conventional DOM tree from a stream encoded in the preferred encoding format. The second one creates what will be called a BDOM tree (Binary DOM tree). A BDOM tree is like a DOM tree but instead of storing node names it stores, for each node, a pair (page number, token) which uniquely identifies the node.

SAX Parser

A conventional SAX parser parses an XML stream and throws SAX events (e.g., characters, startElement, endElement) that can be handled by a specific handler of an application program. Parameters can be passed through these events (e.g. the element name is passed through the startElement and endelement events). These events and their associated parameters are defined by the SAX API.

The SAX parser capable of operation on the compressed stream, herebelow referred to as a compression SAX parser, has been designed to parse a stream encoded with the preferred encoding format. It implements the SAX API. Before reading tokens from the binary input stream, the compression SAX parser creates a LIFO (last in—first out) stack in which it puts the names of the element that are opened and not yet closed. This is so that it can get the name of an element when it ends and send it to the handler. Then it reads tokens from the input stream until the stack is empty.

When the stack is empty, it means that the root element has been closed. Table 3 specifies the action taken for each token type.

TABLE 3

| Token | Action Taken |
|---|---|
| switch page | read the next token which gives the current code page. |
| string inline | read the inline string that follows and throw a character event. |
| extension | read the following content according to its type, translates it into a string and throw a character event. |
| end token | remove the last element of the tag names stack and throw an endElement event with the tag name which has been removed from the stack. |
| not a reserved token | if the token is not a reserved token, then it is a tag token, so the parser looks for the corresponding tag name in the element code space (if not found, an exception is raised). It then calls a method which returns an attributes list. Eventually, it throws a startElement event with the tag name and its corresponding attribute list (if the element has attributes) |

The getAttribute method tests the most significant bit of the tag token to determine if this element has an attribute. If the bit is 0, the element has no attribute and the method returns an empty list. If the bit is 1, the element has attributes and the method reads the attribute tokens from the input stream.

While the most significant bit of the next read token is 0, the parser knows that these tokens are not an attribute value token. The tokens are processed, based upon their types, as described in table 4.

TABLE 4

| Token | Action Taken |
|---|---|
| switch page | read the next token which gives the current code page |
| not a reserved token | if it is not a reserved token, then it is an attribute name token. So the parser looks for the corresponding name in the attribute name code space (if not found, an exception is raised). It then reads the attribute value. |
| end token | end of the attribute list identified; return the attributes list. |

The attribute value can be encoded as a token value, as an inline string (compressed or not) or as a primitive type like byte, integer, float, or boolean.

Binary SAX Parser

While it is expected that parsing a compressed stream using the compression SAX parser is faster than decompressing a compressed XML stream and then parsing it with a conventional SAX parser, it is possible that this could take more time than parsing a non-compressed XML stream with a conventional SAX parser. It has been observed that the part of the processing which takes the most time with the compression SAX parser is the translation of the tokens in elements and attributes names. The reason for this it that, for each received token, the parser must search the code spaces for the corresponding strings. For example, if it receives an element token, it must search the corresponding element name in the element code space and this can take a lot of time, especially if there are many elements in the element code space. Skipping this translation step could make the encoded XML parsing faster. These tokens do not really need to be translated into strings at all. In fact, they can be directly processed by appropriate handlers which recognize the tokens.

A compression Binary SAX parser is like a conventional SAX parser but, instead of studying character based XML streams, it operates on the binary encoded XML and instead of passing tag names and attribute names and values to the handler, as a conventional or a compression SAX parser does, it passes encoding tokens without translating them into strings. More precisely, each time it throws a startElement event or an endElement event, it passes a pair (code page, element token) which uniquely identifies the element. For a startElement event, it also passes a binary attribute list which is a variant of the XML SAX attribute list implementation. The attribute list passed by the BSAX parser, instead of containing triples (attribute name, attribute type, attribute value) contains triples (attribute name uid, attribute type, attribute value uid) if the type of the attribute is "enumerated" or triples (attribute name uid, attribute type, attribute value) if the type of the attribute is "CDATA". A "uid" (unique identifier) is a pair (code page, token). It can uniquely identify an attribute name or an attribute value. Table 5 illustrates the differences between the compression SAX parser and the compression BSAX parser:

TABLE 5

| Interface | SAX parser | Binary SAX parser |
|---|---|---|
| Handler | startElement(String name, AttributeList) | startElement(int token, BAttributeList) |
| AttributeList | getName(int i) returns the name | getNameToken(int i) returns a token |
| AttributeList | getValue(int i) returns the value | getValueToken(int i) returns a token |
| | | getValue(int i) returns an Object |

A SAX handler for the compression BSAX parser is able to recognize (code page, token) to trigger special processing adapted to the element or the attribute. This is faster than a conventional handler because, instead of comparing two strings (a time consuming operation), it just has to compare two pairs of bytes.

DOM Parser

The compression DOM parser is able to build a DOM tree dynamically from a binary XML stream. The top-level architecture of the compression DOM parser is almost the same as the architecture of the compression SAX parser. Like the compression SAX parser, the DOM parser creates a LIFO stack to store the names of the opened elements. Then it reads tokens from the input stream until the stack is empty. It differs from the SAX parser in the processing which is done for each type of token. Table 6 provides the parser decision table for element tokens:

TABLE 6

| Token | Action Taken |
| --- | --- |
| switch page | read the next token which gives the current code page. |
| string inline | reads the inline string that follows and creates a text node and appends this text node to the last opened element (the first element of the LIFO stack). |
| extension | read the content following the content according to its type, translates it into a string, creates a text node and appends it to the last opened element. |
| end token | just remove the last element of the tag names stack. |
| not a reserved token | if this is not a reserved token, then it is a tag token, so looks for the corresponding tag name in the element code space (if not found, an exception is raised). It then creates an element node. If the stack is empty, it means that this element is the root of the document, so it is appended to the document node. If the stack is not empty, the element is appended to the last opened element (the first in the LIFO stack). Eventually, the parser tests the last bit of the token, if it is 1, it invokes a method which gets the attributes for this element. |

The getAttributes method reads the attribute tokens from the binary XML stream. While the most significant bit of the next read tokens is 0, the parser knows that these tokens are not attribute value tokens. Table 7 provides the parser decision table for attribute tokens:

TABLE 7

| Token | Action Taken |
| --- | --- |
| switch page | it reads the next token which gives the current code page. |
| end token | this is the end of the attribute list. The method exits. |
| not a reserved token | if it is not a reserved token, then it is an attribute name token. So the parser looks for the corresponding name in the attribute name code space (if not found, an exception is raised). It then reads the attribute value. Eventually, it adds this attribute to the current element. |

The attribute value can be encoded as a token value or as an inline string (compressed or not).

Binary DOM Parser

The compression Binary DOM parser implements the Binary DOM (BDOM) API (described below). Table 8 describes the action taken by the parser on different types of tokens:

TABLE 8

| Token | Action Taken |
| --- | --- |
| switch page | no change |
| string inline | no change |
| extension | the BDOM parser can create a primitive type node (boolean, byte, integer, float, binary data) defined by the BDOM API by invoking the methods createBooleanNode, createByteNode, createIntegerNode, createFloatNode or createBinaryData of the class BDocument. This node is then appended to the last opened element by invocation of the method appendChild. |
| end token | no change |
| tag token | the BDOM parser creates a BElement node by invoking the method createElement of the class BDocument with a short as parameter. The first byte (most significant) of this short is the code page of the tag and the second byte is the tag token. |

TABLE 8: Millau Binary DOM parser decision table

The Binary DOM API implements all the interfaces of the DOM API as defined by the W3C. However, instead of creating a tree with tag and attribute names as strings, in a Binary DOM tree the tag and attribute names are stored as tokens and therefore is space-efficient. The correspondence between names and pairs (code page, token) is stored in the code spaces so that names can be normally retrieved for every element or attribute nodes. Attribute values can be stored as tokens, if available, as strings, or as primitive types. The primitive types supported by the BDOM API are boolean, byte, integer (4 bytes), and float, however, these can easily be expanded. Element contents are also capable of being stored as primitive types. For element contents, one more Binary Node is defined, the Binary Data Node, which stores binary data without base 64 encoding, thus avoiding the 33% overload of the base 64 encoding. This is useful for binary files, like images embedded in an XML document.

In addition to the methods of the DOM API, the BDOM API also provides methods for creating or retrieving elements or attributes by tokens instead of strings. This is useful for applications which have been designed to work with the preferred encoding format. For example, the class BElement (for Binary Element) which implements the DOM interface Element has also a method getTagToken( ) which returns a short where the first byte is the code page and the second byte is the tag token. For convenience, the class BDocument which implements the DOM interface Document provides a method writeBinaryXML(OutputStream), which writes the BDOM tree in the preferred encoding format to the OutputStream.

At this point it should be noted that, for applications which can work with tokens without translating them into strings, there is no need for code spaces. This saves memory and CPU power. However, to facilitate the task of the developer of the application, the tokens can be stored as static variables with explicit names. With this in mind, a discussion of an efficient way of generating the code spaces will be given to provide understanding for applications which are designed not to handle tokens, however, this process is not needed if applications can work directly with tokens.

The choice of the data structure to represent the code spaces is important for good performance of the system. The translation time is mostly influenced by the time it takes to look up in the code spaces for a token or for its corresponding string. Depending on what the program needs to do, translating strings into tokens or tokens into strings, different data structure may be used. For example, to convert strings into tokens quickly, strings must be found quickly in a table. For this, it is better to use a hash table where the keys are the strings and the values are the corresponding tokens. But, if given a page number and an index in a code page, the corresponding string must be found quickly, the best data structure is a two dimensional array indexed by page numbers and indexes in pages. If it is needed to find a string from a token quickly or a token from a string, then there is a need to sort the table and then do a binary search to find a string corresponding to a token.

Next a method to fill in the hash table for element code space is described. First, the page number variable is set to 0 and the index variable to 5 (the first four indexes are reserved for global tokens). For each element declaration, the system gets the element name, adds it in the hash table with the element name as the key and (56×pageNumber+index) as the value. The system increments the index by 1. The size of a page for elements is 64 because the last two bits of the index are reserved so when the index reaches the value 64, the system increments the page number by 1 and resets the index to 5. When the page number reaches its maximum value 255, an exception is raised.

For each element declared, the system gets the corresponding attribute declaration from the previously built DOM tree. It adds the attribute name in the hash table with the attribute name as the key and (256×pageNumber+index) as the value. If the attribute type is enumerated (enumerated attribute types are NOTATION or NAME_TOKEN_GROUP), then the system looks for the values of this enumerated attribute. For each value, it adds the attribute value in the hash table with the attribute value as the key and (256×pageNumber+index) as the value. The system increments the index for the value by 1. The size of a page for attribute value is 128 so when the index reaches the value 128, the system increments the page number by 1 and resets the index to 5. When the page number reaches its maximum value 255, an exception is raised. If there are no values or when the values have been successfully added to the attribute value code space, the system increments the index for the name by 1. The size of a page for attribute name is 128 so when the index reaches the value 128, the system increments the page number by 1 and resets the index to 5. When the page number reaches its maximum value 255, an exception is raised.

Next, the method to fill in the 2-dimensional array for element code space is described. First, the page number variable is set to 0 and the index variable to 5 (the first four indexes are reserved for global tokens). For each element declaration, the system gets the element name, adds it in the elements array at position (page number, index). The system increments the index by 1. The size of a page for elements is 64 because the last two bits of the index are reserved so when the index reaches the value 64, the system increments the page number by 1 and resets the index to 5. When the page number reaches its maximum value 255, an exception is raised.

The attribute names code space and the attribute values code space can be merged into one so that each pair (attribute name, attribute value) is a single token instead of two tokens (name and value). The code space is filled as follows. For each element declared, the system gets the corresponding attribute declaration from the previously built DOM structure. If the attribute type is not enumerated (no specific value is declared for this attribute), then the system adds the attribute name in the attribute code space (hash table for the server, array for the client). If the attribute type is enumerated, then the system looks for the values of this enumerated attribute. For each value, it adds the pair (attribute name, attribute value) with a specific token in the attribute code space. When the server comes across an attribute with a value, it looks in the attribute code space for the couple (attribute name, attribute value). If it can find it, it sends this token. If it cannot find it, it looks for the attribute name in the attribute code space. If the name is found, the server sends the corresponding token for this name followed by a string inline token followed by the attribute value encoded in the charset specified at the beginning of the binary XML stream. If the name is not found, an exception is raised.

Attributes maybe mandatory (#REQUIRED), optional (#IMPLIED), or can have fixed values #FIXED). For mandatory or fixed attributes, it is not necessary to transmit tokens. To achieve this optimization, the system can store in the element code space the names of the required or fixed attributes with the element name. For example, if attributes Author and Genre are required for element Book, the element code space stores the triplet (Book, Author, Genre) at the entry Book. This element code space is filled as follows. For each element declaration, the system gets the element name and the required and fixed attributes. It adds the element names and the required and fixed attribute names to the element code space. For the fixed attributes, it also adds their value. In the attribute code space, only the implied attributes will be stored with their corresponding values (if defined).

Having described the preferred compression method, a system of the present invention which utilizes compression in the implementation of XML-RPC will be described. First, however, a brief description of the XML-RPC protocol will be given.

As previously described, XML-RPC is a method of performing RPCs over HTTP using XML. A remote procedure call is performed by the client, which may be the sender itself, or which is acting as a handler of RPC requests which cross machine boundaries, sending an HTTP-POST message to a server. In other words, the client can be implemented as an application itself, as a method associated with an application, or as a lower level utility. An HTTP-POST message is a message in HTTP in which the client sends data which is to be processed by code at the server. In an XML-RPC message, the body of the POST is in XML. If the server is only processing XML-RPC requests, it is processed right there. If the server is handling a mix of HTTP requests, the RPC will be directed to, and the server will forward, the RPC to the appropriate code to process it.

As an example, the client would prepare and send the following XML-RPC request to the server:

```
POST/XMLRPC HTTP/1.0
User-Agent: Jericho/4.1.1 (WinNT)
Host: marc.ibm.com
```

-continued

```
Content-Type: text/xml
Content-length: 181
<?xml version="1.0"?>
<methodCall>
    <methodName>examples.getFirstName</methodName>
    <params>
        <param>
            <value><i4>41</i4></value>
        </param>
    </params>
</methodCall>
```

When the server is only handling XML-RPC calls, the URI in the first line of the header is not specified. However, in the above example, the server would be handling a mix of HTTP requests and the URI helps to route the request to the code which handles XML-RPC requests. Specifically, the URI is /XMLRPC, telling the server to route the request to the XMLRPC responder.

In this example, when the server receives the POST message, it routes the message to the XML-RPC code, the XML body would then be parsed, and the code which handles the XML-RPC requests would perform the appropriate actions so that the method indicated in the XML code would be performed.

After the method has been performed, the code takes the parameters returned by the method and encodes them in an XML document. The code then either packages the document and sends the response via HTTP back to the client, or passes the document to the server and the server packages and sends the response back to the client. The following is an example of the response sent back to the client:

```
HTTP/1.1 200 OK
Connection: close
Content-Length: 158
Content-type: text/xml
Date: Fri, Sep. 15, 2000 13:04:09 GMT
Server: Jericho/4.1.1-WinNT
<?xml version="1.0"?>
<methodResponse>
    <params>
        <param>
            <value><string>Donald</string></value>
        </param>
    <params>
</methodResponse>
```

When received by the client, the response is parsed and the returned parameters are utilized by the client, or forwarded to the process which initiated the RPC.

To provide clarification with respect to the client, it should be noted that, as is understood in the art, there may be a number of processes running on the client-side system. Any of these processes can perform a remote procedure call. The remote procedure call can be non-transparent in the sense that the process realizes it is making a remote procedure call and invokes the client to generate an XML-RPC message and send it to the server and additionally listens for the response. Or, the process can invoke all the methods required to perform the RPC, thus acting as the client itself. Alternatively, the remote procedure call can be transparent in the sense that the process performs the call as it would a normal procedure call. An underlying process recognizes the call as a remote procedure and passes the call to the client of the XML-RPC system, which takes the appropriate measures to create and send the XML-RPC message and to listen and forward the response to the appropriate process. The client acts as a handler for procedure calls which are remote procedure calls. Likewise, as previously described, the server may process the requests itself, or it, or another process associated with it, may merely act as a router to route the call to the appropriate process.

With this in mind, the following description will be made from the perspective that the client prepares the remote procedure call in a manner appropriate with regard to an efficient implementation and transmission of a XML-RPC protocol message according to the present invention, without regards to specifically how the RPC originated.

The preferred encoding format is particularly well suited to XML-RPC. This is due to the fact that the messages exchanged are very short and may not contain redundant tags. Hence other methods have poor performance with regards to these kinds of messages. Additionally, XML-RPC uses a limited set of tags (20 different tags) and no attributes. Hence all the tags can be held on one code page so there is no switching of pages. Additionally, by designing the XML-RPC mechanisms to work with tokens, there is no need to store code pages in memory. However, if it is desired to design the mechanisms not to operate with tokens, the efficient code space generation of the preferred encoding format can be utilized. Moreover, most of the content of an XML-RPC document is of the primitive type, and as the preferred encoding provides tokens for primitives, primitives can be transmitted without text encoding.

Generally, the system of the present invention comprises a client which generates XML-RPC requests in the preferred compression format and a server which gets the requests from the clients, invokes the corresponding method and sends a response encoded in the preferred encoding format.

Figure 4:
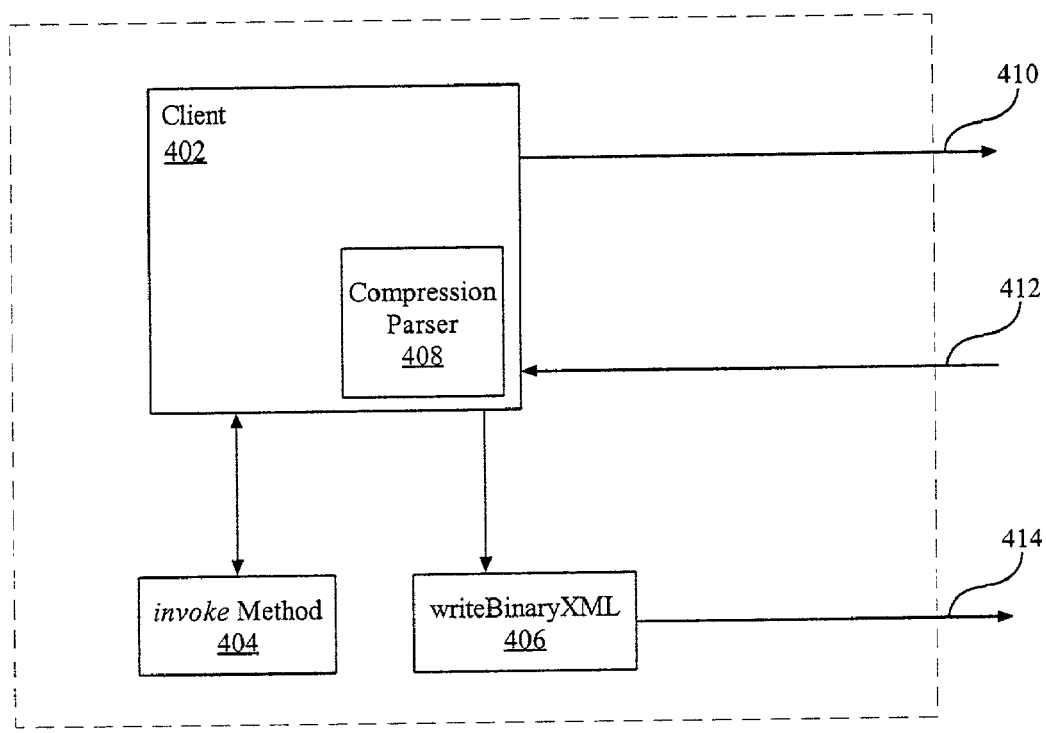
FIG. 4 illustrates the client side of the system of the present invention.

FIG. 4 illustrates the client side of the system for performing XML-RPC according to the present invention. Preferably, the client is designed so as to work with tokens, and in that manner there is no need to store or generate code spaces. The client side of the system is implemented on a computer 400 and comprises a XML-RPC client 402. A URL of an XML-RPC server is passed to client 402. The client 402 then opens a persistent connection with the server over HTTP. The client sends a request to the server to open a persistent connection by sending a request on the logical connection which HTTP utilizes, typically using port 80, as indicated by line 410. This establishes a connection to the server which the client can listen to responses, as indicated by line 412, or sends further requests, as indicated by line 414. The invoke method 404 is then called, passing the name of the procedure call (method) as "handler.method" and a vector of the parameters. From the method name and the parameters, the client will generate an XML-RPC request in the preferred encoding format, using the previously described BDOM API. It should be noted that while both APIs are envisioned, the use of the SAX API may provide for improved efficiency. The client then calls the writeBinaryXML method on the BDOM tree to generate a binary XML stream of the preferred encoding type that is sent to the server on the previously opened socket (logical connection 414). The client listens to the previously opened socket 412 for the response from the server. If it is a valid XML-RPC response message, it is parsed by the compression parser 408, preferably the BDOM parser and the result is then utilized or forwarded to the process. If the result is an error, this is reported to the appropriate process. It should be noted that, while two separate lines have been indicated for the outgoing and incoming portions of the connection, this is in fact the same persistent connection opened by the client. As an alternative, a separate persistent connection need not be opened, but rather, all the messaging is performed using the standard connection for HTTP.

Figure 5:
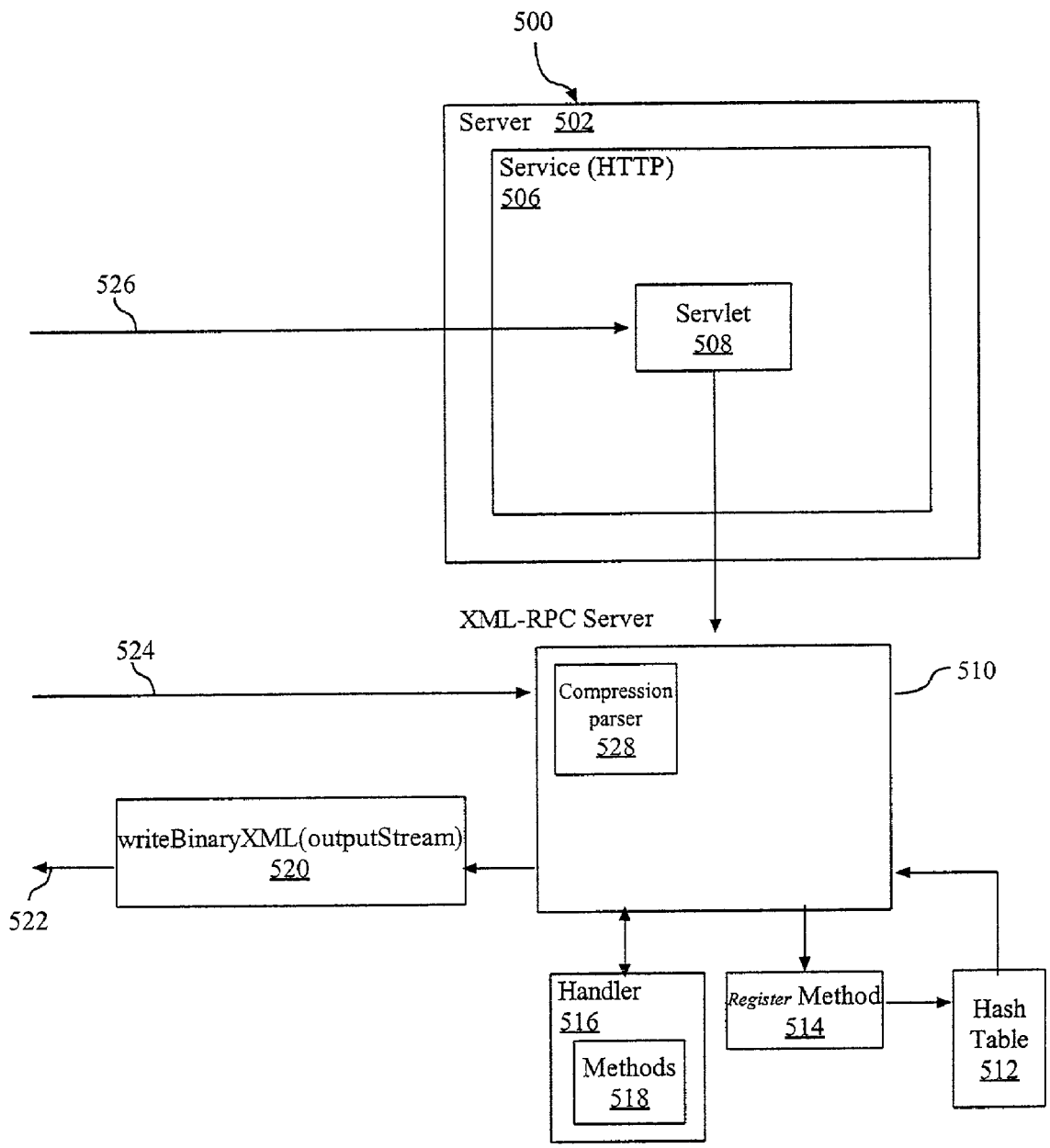
FIG. 5 illustrates the server side of the system of the present invention.

FIG. 5 illustrates the server side of the system for performing efficient XML-RPC according to the present invention. The server side system is implemented on a computer 502 and comprises a server 502 running an HTTP service 506. As is well understood, a server can provide a number of services such as HTTP, FTP, Gopher, Telnet, DHCP, SMTP etc. However, a particular server may only provide one service. When a server only provides one service, the server and service can logically be thought of as the same. The practice of the present invention does not require that a server provide more than one service, the illustrated separation of the server 502 and HTTP service 506 has only been provided in the illustration in order to provide the above understanding.

Associated with the HTTP service 508 is JAVA™ servlet 508. A servlet is a module which runs inside a request-response oriented service, such as HTTP, and provides for an extension of the functionality of that service. In the present invention, when the XML-RPC client 402 wants to establish a persistent connection with the XML-RPC server 10, it sends a request via HTTP which is processed by the servlet 508. The init method of the servlet is then invoked and creates the XML-RPC server 510. The XML-RPC server 510 then establishes a persistent connection with the client 402. Additionally, when server 510 is created, it invokes its register method 514 to register the handler object and associated methods (procedures) which can be called by the client. The server also has a remove method to remove registered handlers and associated methods from its name. References to the handlers registered by register method 514 are stored in a hash table 512.

When an XML-RPC request in the preferred encoding format is then received by the server 510 from client 402, it is parsed by the compression parser 528 such as the previously described BDOM parser. Server 510 then tries to find the handler object and method corresponding to the method name of the request in the hash table. If it is found, the server calls the handler and associated method 518 and encodes the response in a XML-RPC response in the preferred encoding format utilizing the BDOM API. The server then calls the method writeBinaryXML 520 of this API which generates a stream in the preferred binary format that is sent as the body of the response 522. If the method is not found, the server 510 returns an error.

Further explanation of the method followed by the client will now be given to insure a clearer understanding of the present invention. First, the client opens a persistent connection with the server. Next, when the invoke method of the client is called with the name of the method and parameters, the client generates an encoded XML-RPC request by the following:

Generating a METHOD_CALL token followed by a METHOD_NAME token. The METHOD_NAME token is followed by the method name as "handler.method" which is followed by an END token (which corresponds to the end of METHOD_NAME)

PARAMS token is generated followed by encoded parameters. Each encoded parameter is a PARAM token followed by a VALUE token followed by the data type token (INT, BOOLEAN, STRING, DOUBLE, DATE, BASE64, STRUCT, ARRAY) followed by the parameter value, followed by 3 END tokens (corresponding to the end of the data type token, VALUE token and PARAM token). Once the parameters have been encoded, 2 more END tokens are generated (corresponding to the end of PARAMS and METHOD_CALL). If the parameter value is of the primitive type (int, boolean, string or double, it is sent without any special encoding (in binary format) because there is no need for text transcoding. Additionally, the values can be sent as a separate stream if they are more complex than primitives and character level compression can be performed.

If the parameter values are structures or arrays, special processing occurs:

A structure is transmitted as a STRUCT token followed by members. A member is represented as a MEMBER token followed by a NAME token followed by the name of the member followed by an END token followed by a VALUE token followed by the value followed by 2 END tokens. The value type can be of the primitive type, a structure, or an array.

An array is transmitted as an ARRAY token followed by a DATA token followed by values followed by an END token. The values can be of the primitive type, a structure or an array.

In like fashion, a further explanation of the method of the server side will follow to provide a clearer understanding of the present invention. When the server receives the request, it is parsed and the method name in the form of "handler-.method" and the parameters are retrieved. The server then looks for the object "handler" in the hash table. If the handler is not found or the handler does not have an the associated message, an error message is returned to the client. If the handler and associated method are located, the server invokes the method passing the retrieved parameters. When the return parameters are returned to the server, it generates a response message by:

Generating a METHOD_RESPONSE token followed by a PARAMS token followed by a single PARAM token followed by a VALUE token followed by the token type of the value (primitive, structure or array) followed by the value of the return parameter, followed by 5 END tokens.

While the preferred embodiment of the present has been described utilizing a JAVA™ servlet mechanism, it is readily obvious to one of skill in the art that the routing function could be performed utilizing a CGI/script implemented in JAVA™ or C++ or the like as is conventional in the art. In addition, rather than invoking a whole new server process, the server function is implemented as a CGI/script, as is conventional in the art to process the POST requests and perform the necessary mechanism to process the XML-RPC requests and generate the appropriate responses. In addition, while it has been described that a separate persistent connection is established between the server and client, when the separate server process is utilized, it can readily be seen that an implementation using the conventional, logical HTTP connection may be utilized, with the servlet acting to route all incoming XML-RPC requests to the server, is within the scope of the present invention. Any combination of these methods is viable, so long as the functionality of the client and server are maintained, i.e. there is a RPC marshalled into a markup language format which is encoded in a tokenized form, it is received and the requested method is invoked, and the return parameters are marshalled into a markup language format which is encoded in a tokenized form and sent back to the requester.

CONCLUSION

A system and method has been shown in the above embodiments for the effective implementation of an efficient XML-RPC system. While a preferred embodiment has been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment or specific computing hardware and specific iconic color or symbol schemes. In addition, specific mechanisms and APIs were chosen to implement functions of the present system, however, they are representative of the preferred embodiment and should not limit the scope of the invention. Various other mechanisms are available to those skilled in the art to implement the various components and functions of the present invention. In addition, XML is the preferred markup language utilized, as the XML-RPC protocol has been designed to specifically utilize XML. However, the present invention can be practiced utilizing any markup language such as SGML or HTML, as the tokenized forms are equally as applicable to providing efficient transmission and storage of other markup languages, as long as tags are provided which properly direct the RPC applications.

The invention claimed is:

1. A computer-based system to reduce bandwidth utilization by performing remote procedure calls utilizing a markup language as a marshalling format in which a client is passed a method name and associated parameters for a remote procedure call, marshals said method name and parameters into a request markup language format document encoded in a tokenized format and transmits said document, said system comprising:

a markup language remote procedure call server, said server receiving said method name and associated parameters from said tokenized request markup language document;

said server invoking a method corresponding to said method name;

said server receiving return parameters from said invoked method;

said server generating a response markup language document encoded in said tokenized format containing said return parameters;

a parser, said parser parsing said tokenized request markup language format document and presenting said document to said server such that said server receives said method name and associated parameters; and said bandwidth utilization reduced by applying character level compression to content data separated from structure data of said request markup language format document and said response markup language document.

2. A system to reduce bandwidth utilization by performing remote procedure calls utilizing a markup language as a marshalling format in which a client is passed a method name and associated parameters for a remote procedure call, marshals said method name and parameters into a request markup language format document encoded in a tokenized format and transmits said document, as per claim 1, wherein said parser implements an event-based API.

3. A system to reduce bandwidth utilization by performing remote procedure calls utilizing a markup language as a marshalling format in which a client is passed a method name and associated parameters for a remote procedure call, marshals said method name and parameters into a request markup language format document encoded in a tokenized format and transmits said document, as per claim 2, wherein said parser translates the tokens of said tokenized request document into strings and presents said request document to said server as said strings.

4. A system to reduce bandwidth utilization by performing remote procedure calls utilizing a markup language as a marshalling format in which a client is passed a method name and associated parameters for a remote procedure call, marshals said method name and parameters into a request markup language format document encoded in a tokenized format and transmits said document, as per claim 3, wherein said parser translates the tokens into said strings using a code space generated offline.

5. A system to reduce bandwidth utilization by performing remote procedure calls utilizing a markup language as a marshalling format in which a client is passed a method name and associated parameters for a remote procedure call, marshals said method name and parameters into a request markup language format document encoded in a tokenized format and transmits said document, as per claim 2, wherein said parser presents said request document to said server as tokens.

6. A system to reduce bandwidth utilization by performing remote procedure calls utilizing a markup language as a marshalling format in which a client is passed a method name and associated parameters for a remote procedure call, marshals said method name and parameters into a request markup language format document encoded in a tokenized format and transmits said document, as per claim 1, wherein said parser implements a tree-based API.

7. A system to reduce bandwidth utilization by performing remote procedure calls utilizing a markup language as a marshalling format in which a client is passed a method name and associated parameters for a remote procedure call, marshals said method name and parameters into a request markup language format document encoded in a tokenized format and transmits said document, as per claim 6, wherein said parser translates tokens of said tokenized request document into strings and presents said request document to said server as said strings.

8. A system to reduce bandwidth utilization by performing remote procedure calls utilizing a markup language as a marshalling format in which a client is passed a method name and associated parameters for a remote procedure call, marshals said method name and parameters into a request markup language format document encoded in a tokenized format and transmits said document, as per claim 7, wherein said parser translates the tokens into said strings using a code space generated offline.

9. A system to reduce bandwidth utilization by performing remote procedure calls utilizing a markup language as a marshalling format in which a client is passed a method name and associated parameters for a remote procedure call, marshals said method name and parameters into a request markup language format document encoded in tokenized format and transmits said document, as per claim 6, wherein said parser presents said request document to said server as tokens.

10. A system to reduce bandwidth utilization by performing remote procedure calls utilizing a markup language as a marshalling format in which a client is passed a method name and associated parameters for a remote procedure call, marshals said method name and parameters into a request markup language format document encoded in a tokenized format and transmits said document, as per claim 1, said system further comprising:
a servlet, said servlet receiving a request from said client to establish a connection with said server;
said servlet invoking said server upon receiving said request, said server establishing a connection with said client;
said server registering handler objects and associated methods which were to be invoked via said tokenized request markup language documents transmitted by said client;
wherein references to said handler objects and associated methods are stored in a hash table at said server.

11. A system to reduce bandwidth utilization by performing remote procedure calls utilizing a markup language as a marshalling format in which a client is passed a method name and associated parameters for a remote procedure call, marshals said method name and parameters into a request markup language format document encoded in a tokenized format and transmits said document, as per claim 10, wherein, prior to invoking said method, said server determines if said method corresponding to said method name is registered with said server via said hash table.

12. A system to reduce bandwidth utilization by performing remote procedure calls utilizing a markup language as a marshalling format in which a client is passed a method name and associated parameters for a remote procedure call, marshals said method name and parameters into a request markup language format document encoded in a tokenized format and transmits said document, as per claim 1, said system further comprising:
a servlet running as an extension to a HTTP service and receiving a HTTP-POST message containing said tokenized request markup language document in the body of said HTTP-POST message;
said servlet processing said HTTP-POST message, and wherein upon determining the body of an HTTP-POST request is said tokenized request markup language document, said servlet forwards said tokenized request markup language document to said server upon which said parser parses said document and presents said document to said server such that said server receives said method name and associated parameters.

13. A system to reduce bandwidth utilization by performing remote procedure calls utilizing a markup language as a marshalling format in which a client is passed a method name and associated parameters for a remote procedure call, marshals said method name and parameters into a request markup language format document encoded in a tokenized format and transmits said document, as per claim 1, wherein said markup language is XML.

14. A computer-based system to reduce bandwidth utilization by performing remote procedure calls utilizing a markup language as a marshalling format in which a server receives a request for a remote procedure call including a method name and associated parameters in the form of a request markup language document encoded in a tokenized format, said server invokes a method corresponding to said method name and transmits a response markup language document encoded in tokenized format containing return parameters returned from said invoked method, said system comprising:
a client, said client being passed said method name and associated parameters for said remote procedure call;
said client generating said tokenized request markup language document including said method name and associated parameters and sending said document to said server; and
said bandwidth utilization reduced by applying character level compression to content data separated from structure data of said request markup language document and said response markup language document.

15. A system to reduce bandwidth utilization by performing remote procedure calls utilizing a markup language as a marshalling format in which a server receives a request for a remote procedure call including a method name and associated parameters in the form of a request markup language document encoded in a tokenized format, said server invokes a method corresponding to said method name and transmits a response markup language document encoded in tokenized format containing return parameters returned from said invoked method, as per claim 14, wherein said markup language is XML.

16. A system to reduce bandwidth utilization by for performing remote procedure calls utilizing a markup language as a marshalling format in which a server receives a request for a remote procedure call including a method name and associated parameters in the form of a request markup language document encoded in a tokenized format, said server invokes a method corresponding to said method name and transmits a response markup language document encoded in tokenized format containing return parameters returned from said invoked method, as per claim 14, said system further comprising:
   a parser, said parser receiving said tokenized response markup language document containing said return parameters;
   said parser parsing said tokenized response markup language document and presenting said document to said client such that said client receives said return parameters.

17. A system to reduce bandwidth utilization by performing remote procedure calls utilizing a markup language as a marshalling format in which a server receives a request for a remote procedure call including a method name and associated parameters in the form of a request markup language document encoded in a tokenized format, said server invokes a method corresponding to said method name and transmits a response markup language document encoded in tokenized format containing return parameters returned from said invoked method, as per claim 16, wherein said parser implements an event-based API.

18. A system to reduce bandwidth utilization by performing remote procedure calls utilizing a markup language as a marshalling format in which a server receives a request for a remote procedure call including a method name and associated parameters in the form of a request markup language document encoded in a tokenized format, said server invokes a method corresponding to said method name and transmits a response markup language document encoded in tokenized format containing return parameters returned from said invoked method, as per claim 17, wherein said parser translates the tokens of said tokenized response document into strings and presents said response document to said client as said strings.

19. A system to reduce bandwidth utilization by performing remote procedure calls utilizing a markup language as a marshalling format in which a server receives a request for a remote procedure call including a method name and associated parameters in the form of a request markup language document encoded in a tokenized format, said server invokes a method corresponding to said method name and transmits a response markup language document encoded in tokenized format containing return parameters returned from said invoked method, as per claim 18, wherein said parser translates the tokens into said strings using a code space generated offline.

20. A system to reduce bandwidth utilization by performing remote procedure calls utilizing a markup language as a marshalling format in which a server receives a request for a remote procedure call including a method name and associated parameters in the form of a request markup language document encoded in a tokenized format, said server invokes a method corresponding to said method name and transmits a response markup language document encoded in tokenized format containing return parameters returned from said invoked method, as per claim 17, wherein said parser presents said response document to said client as tokens.

21. A system to reduce bandwidth utilization by performing remote procedure calls utilizing a markup language as a marshalling format in which a server receives a request for a remote procedure call including a method name and associated parameters in the form of a request markup language document encoded in a tokenized format, said server invokes a method corresponding to said method name and transmits a response markup language document encoded in tokenized format containing return parameters returned from said invoked method, as per claim 16, wherein said parser implements a tree-based API.

22. A system to reduce bandwidth utilization by performing remote procedure calls utilizing a markup language as a marshalling format in which a server receives a request for a remote procedure call including a method name and associated parameters in the form of a request markup language document encoded in a tokenized format, said server invokes a method corresponding to said method name and transmits a response markup language document encoded in tokenized format containing return parameters returned from said invoked method, as per claim 21, wherein said parser translates the tokens of said tokenized response document into strings and presents said response document to said client as said strings.

23. A system to reduce bandwidth utilization by performing remote procedure calls utilizing a markup language as a marshalling format in which a server receives a request for a remote procedure call including a method name and associated parameters in the form of a request markup language document encoded in a tokenized format, said server invokes a method corresponding to said method name and transmits a response markup language document encoded in tokenized format containing return parameters returned from said invoked method, as per claim 22, wherein said parser translates the tokens into said strings using a code space generated offline.

24. A system to reduce bandwidth utilization by performing remote procedure calls utilizing a markup language as a marshalling format in which a server receives a request for a remote procedure call including a method name and associated parameters in the form of a request markup language document encoded in a tokenized format, said server invokes a method corresponding to said method name and transmits a response markup language document encoded in tokenized format containing return parameters returned from said invoked method, as per claim 21, wherein said parser presents said response document to said client as tokens.

25. A system to reduce bandwidth utilization by performing remote procedure calls utilizing a markup language as a marshalling format in which a server receives a request for a remote procedure call including a method name and associated parameters in the form of a request markup language document encoded in a tokenized format, said server invokes a method corresponding to said method name and transmits a response markup language document encoded in tokenized format containing return parameters returned from said invoked method, as per claim 14, wherein said method name and associated parameters are passed to said client via an invoke method of said client.

26. A computer-based system to reduce bandwidth utilization by performing efficient remote procedure calls, utilizing XML as a marshalling format, where a method name and associated parameters are included in a remote procedure call request XML document encoded in tokenized format transmitted as the body of a HTTP-POST message, said system comprising:
  a markup language remote procedure call server, said server receiving said method name and associated parameters from said tokenized request XML document;
  a servlet, said servlet receiving a request from said client to establish a connection with said server;
  said servlet invoking said server upon receiving said request, said server establishing a connection with said client;
  said server registering handler objects and associated methods which are able to be invoked via said tokenized request XML documents transmitted by said client, references to said handler objects and associated methods stored in a hash table at said server;
  said server determining if a method corresponding to said method name is registered utilizing said hash table and upon determining said method is registered, said server invoking said method corresponding to said method name;
  said server receiving return parameters from said invoked method;
  said server generating a response XML document encoded in said tokenized format containing said return parameters;
  a server side parser, said server side parser parsing said tokenized request XML format document and presenting said document to said server such that said server receives said method name and associated parameters; and
  said bandwidth utilization reduced by applying character level compression to content data separated from structure data of said request XML document and said response XML document.

27. A system to reduce bandwidth utilization by for performing efficient remote procedure calls, utilizing XML as a marshalling format, where a method name and associated parameters are included in a remote procedure call request XML document encoded in tokenized format transmitted as the body of a HTTP-POST message, as per claim 26, said system further comprising:
  a client, said client being passed said method name and associated parameters for said remote procedure call;
  said client generating said tokenized request XML document including said method name and associated parameters and sending said request document to said server;
  a client side parser, said client side parser receiving said tokenized response XML document upon said server sending said document, and
  said client side parser parsing said tokenized response XML document and presenting said document to said client such that said client receives said return parameters.

28. A system to reduce bandwidth utilization by performing efficient remote procedure calls, utilizing XML as a marshalling format reducing bandwidth utilization, where a method name and associated parameters are included in a remote procedure call request XML document encoded in tokenized format transmitted as the body of a HTTP-POST message, as per claim 26, wherein said server side parser implements an event-based API.

29. A system to reduce bandwidth utilization by performing efficient remote procedure calls, utilizing XML as a marshalling format reducing bandwidth utilization, where a method name and associated parameters are included in a remote procedure call request XML document encoded in tokenized format transmitted as the body of a HTTP-POST message, as per claim 26, wherein said server side parser implements a tree-based API.

30. A system to reduce bandwidth utilization by performing efficient remote procedure calls, utilizing XML as a marshalling format reducing bandwidth utilization, where a method name and associated parameters are included in a remote procedure call request XML document encoded in tokenized format transmitted as the body of a HTTP-POST message, as per claim 27, wherein said client side parser implements an event-based API.

31. A system to reduce bandwidth utilization by performing efficient remote procedure calls, utilizing XML as a marshalling format reducing bandwidth utilization, where a method name and associated parameters are included in a remote procedure call request XML document encoded in tokenized format transmitted as the body of a HTTP-POST message, as per claim 27, wherein said client side parser implements a tree-based API.

32. A computer-based method to reduce bandwidth utilization by implementing a remote procedure call in which a client generates a request markup language document encoded in tokenized format including a method name and associated parameters, said method comprising:
  receiving said tokenized request markup language document;
  parsing said document to determine said method name and associated parameters;
  invoking a method corresponding to said method name and passing said parameters to said method;
  receiving return parameters from said method;
  generating a response markup language document including said returned parameters, said response markup language document encoded in a tokenized format; and
  said bandwidth utilization reduced by applying character level compression to content data separated from structure data of said request markup language document and said response markup language document.

33. A method to reduce bandwidth utilization by implementing a remote procedure call in which a client generates a request markup language document encoded in tokenized format including a method name and associated parameters, as per claim 32, wherein said markup language is XML.

34. A computer-based method to reduce bandwidth utilization by performing remote procedure calls utilizing a markup language as a marshalling format in which a server receives a request markup language document encoded in tokenized format including a method name and associated parameters, said server invokes a method corresponding to said method name and returns a tokenized response markup language document including returned parameters returned from said method, said method of performing remote procedure calls comprising:
  receiving a method name and associated parameters;
  generating a request markup language document including said method name and associated parameters, said request markup language document encoded in a tokenized format;

sending said tokenized request markup language document to said server;
receiving said tokenized response markup language document returned from said server; and
parsing said tokenized response markup language server to obtain said return parameter; and
said bandwidth utilization reduced by applying character level compression to content data separated from structure data of said request markup language document and said response markup language document.

35. A method to reduce bandwidth utilization by performing remote procedure calls utilizing a markup language as a marshalling format in which a server receives a request markup language document encoded in tokenized format including a method name and associated parameters, said server invokes a method corresponding to said method name and returns a tokenized response markup language document including returned parameters returned from said method, as per claim 34, wherein said markup language is XML.

36. An article of manufacture comprising a computer user medium having computer readable code embodied therein to reduce bandwidth utilization by implementing a remote procedure call in which a client generates a request markup language document encoded in tokenized format including a method name and associated parameters, said computer readable code comprising:
 computer readable program code receiving said tokenized request markup language document;
 computer readable program code parsing said document to determine said method name and associated parameters;
 computer readable program code invoking a method corresponding to said method name and passing said parameters to said method;
 computer readable program code receiving return parameters from said method;
 computer readable program code generating a response markup language document including said returned parameters, said response markup language document encoded in a tokenized format; and
 computer readable program code applying character level compression to content data separated from structure data of said request markup language document and said response markup language document.

37. An article of manufacture comprising a computer user medium having computer readable code embodied therein to reduce bandwidth utilization by performing remote procedure calls utilizing a markup language as a marshalling format in which a server receives a request markup language document encoded in tokenized format including a method name and associated parameters, said server invokes a method corresponding to said method name and returns a tokenized response markup language document including returned parameters returned from said method, said computer readable code comprising:
 computer readable program code receiving a method name and associated parameters;
 computer readable program code generating a request markup language document including said method name and associated parameters, said request markup language document encoded in a tokenized format;
 computer readable program code sending said tokenized request markup language document to said server;
 computer readable program code receiving said tokenized response markup language document returned from said server; and
 computer readable program code parsing said tokenized response markup language server to obtain said return parameter; and
 computer readable program code applying character level compression to content data separated from structure data of said request markup language document and said response markup language document.

38. A system to reduce bandwidth utilization by performing remote procedure calls utilizing a markup language as a marshalling format in which a client is passed a method name and associated parameters for a remote procedure call, marshals said method name and parameters into a request markup language format document encoded in a tokenized format and transmits said document, as per claim 1, wherein at least one of tokens in said tokenized format is an attribute start token which is followed by a single attribute value token, string, entity or extension token.

39. A system to reduce bandwidth utilization by performing remote procedure calls utilizing a markup language as a marshalling format in which a client is passed a method name and associated parameters for a remote procedure call, marshals said method name and parameters into a request markup language format document encoded in a tokenized format and transmits said document, as per claim 38, wherein said extension token prefixes attribute values of primitive type.

40. A system to reduce bandwidth utilization by performing remote procedure calls utilizing a markup language as a marshalling format in which a client is passed a method name and associated parameters for a remote procedure call, marshals said method name and parameters into a request markup language format document encoded in a tokenized format and transmits said document, as per claim 1, wherein said tokenized format provides three overlapping cope spaces, a tag codespace, attribute start codespace and attribute value codespace, thereby increasing the number or attribute start tokens and attribute value tokens utilized.

* * * * *